United States Patent [19]

Perlman et al.

[11] Patent Number: 4,882,563

[45] Date of Patent: Nov. 21, 1989

[54] HOOD ORNAMENT THEFT ALARM

[76] Inventors: Marvin K. Perlman, 234 Morena Blvd.; Richard S. Perlman, 2311 Morena Blvd., both of San Diego, Calif. 92110

[21] Appl. No.: 341,632

[22] Filed: Apr. 21, 1989

[51] Int. Cl.⁴ .............................................. B60Q 1/00
[52] U.S. Cl. .................................... 340/426; 307/10.2; 340/568
[58] Field of Search ................. 340/426, 429, 96, 568, 340/571, 572, 668, 686, 687; 116/33; 362/80; 307/10.2; 180/287

[56] References Cited

U.S. PATENT DOCUMENTS

| | | | |
|---|---|---|---|
| 4,137,521 | 1/1979 | Martinez | 340/426 |
| 4,293,860 | 10/1981 | Iwata | 340/429 |
| 4,542,373 | 9/1985 | Hillock | 340/568 |
| 4,783,352 | 11/1988 | Kaiser, Jr. | 40/591 |
| 4,788,550 | 11/1988 | Chadima, Jr. | 343/714 |
| 4,796,002 | 1/1989 | Heidman, Jr. | 180/287 |

Primary Examiner—Joseph A. Orsino
Assistant Examiner—Brent A. Swarthout
Attorney, Agent, or Firm—Ralph S. Branscomb

[57] ABSTRACT

A theft alarm is provided for a hood ornament utilizing a pair of spaced plugs held apart by a coil spring and retained together by a central hook and threaded post which extend through axial bores through the plugs with the hook extending up through the hole in the hood to engage the hood ornament. The plugs each mount an electrical contact, and when the ornament is deflected, the coil spring is compressed between the plugs, bringing the electrical contacts into contact and setting off an alarm, which ordinarily is the vehicle's horn.

7 Claims, 1 Drawing Sheet

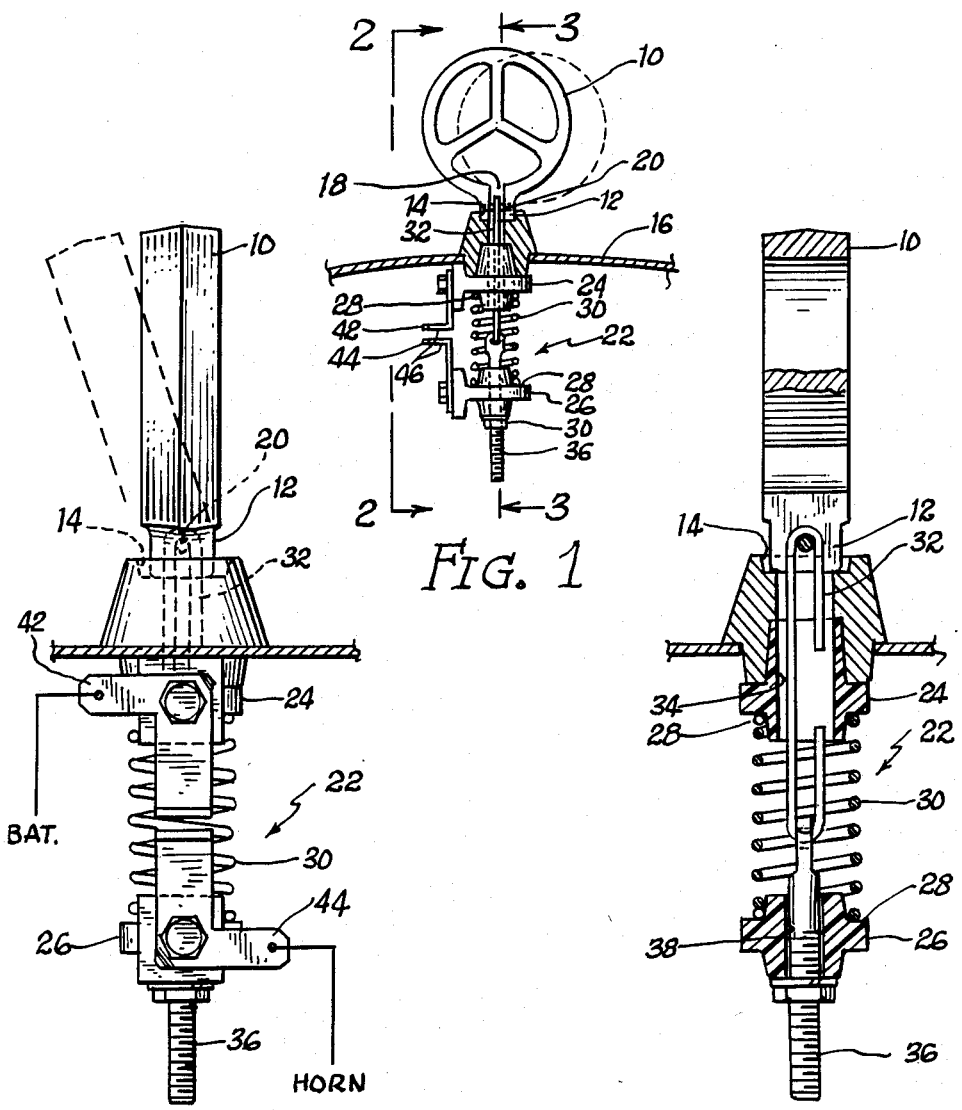

HOOD ORNAMENT THEFT ALARM

BACKGROUND OF THE INVENTION

Fancy hood ornaments, most notably on Cadillacs and Mercedes Benz automobiles, seat in shallow sockets defined in the hood, and are retained by elastic means that engage the hood ornament and pass through an aperture in the hood and are retained on the underside of the hood. If they are struck by anything, as they inevitably are over the life of the car, rather than break off, because of the resilient mounting they just deflect and snap back upright when the deflecting force abates.

This works well when the ornament is struck. However, this mounting system does not work very well in preventing theft of the hood ornament. Although perhaps a few years ago hood ornament theft was generally unknown, increasingly, whether for reasons of monetary gain, resentment, thrills, or for personal motives, thieves are taking hood ornaments. Such thievery puts the owners not only to the cost of replacing the ornament, but to the nuisance of having to go to the dealership or other source and take the time to secure another ornament and install it.

There have been devices in the past which are installed beneath the hood to sound the horn when the ornament is deflected, thus hopefully thwarting would be thieves. However, typically these are quite involved in their installation and expensive to purchase.

There is a need for a hood ornament theft alarm which is simple to install, economical to manufacture, and nearly foolproof in its functioning so that it cannot easily be circumvented by a would be thief.

SUMMARY OF THE INVENTION

The instant invention fulfills the above stated need by providing a hood ornament that is easily clipped into place beneath the hood, hooking onto the crossbar of the hood ornament, and is then subsequently easy to install in the alarm circuit by means of connecting wires between the power supply of the vehicle and the vehicle horn, so that deflection of the ornament energizes the horn.

Whereas some prior devices operate by contacting the hood to complete an electrical circuit when the ornament is deflected, these systems require that paint be scraped from the underside of the hood, subjecting it to rust and corrosion, not to mention requiring the initial effort of scraping off the paint. The theft alarm disclosed herein requires no such scraping of paint, inasmuch as it defines two contacts which are brought together to make the contact when the ornament is deflected.

The two metal contacts are mounted on spaced plastic, nonconductive plugs that are maintained apart by a coil compression spring. A bolt with a hook connected to the top hooks on the ornament cross bar and passes down through the hood, through the top plug of the coil spring in the bottom plug, and engages underneath the bottom plug.

The contacts on the plugs are slightly spaced axially, so that when the hood ornament is deflected, the hook pulls the threaded post which passes down through the plugs and coil spring, pulling the lower plug upward, and bringing its contacts into contact with the closely spaced brass contact on the other upper plug, sounding the horn.

BRIEF DESCRIPTION OF THE DRAWINGS

FIG. 1 is a front elevation view of the theft alarm showing it as it appears installed, with portions of the hood and comprising springs shown in sections;

FIG. 2 is a section taken along line 2—2 of FIG. 1; and

FIG. 3 is a section taken along line 3—3 of FIG. 1.

DETAILED DESCRIPTION OF THE PREFERRED EMBODIMENT

A typical hood ornament for a Mercedes is shown at 10. The hood ornament has a lower boss 12 which fits in a socket 14 defined in the structure of the hood 16. The boss 12 has a vertical bore 18, or a lateral slot would do as well, which mounts a retainer pin 20. Ordinarily, a spring loop engages this hook and passes beneath the hood 16, with a stop on the underside to tension the resilient retainer means attached to the hood ornament.

In this case, the existing connecting structure is removed, and instead the theft alarm 22 is put in its place. The theft alarm is defined by upper and lower plugs 24 and 26, respectively. These plugs define facing annular seating areas 28 which capture in seated relation the coil compression spring 30.

The coil spring tries to maintain the plugs separated to the maximum expanded spring length, but is opposed by the hook 32 which engages the pin 20 of the hood ornament and passes through the bore 18 in the hood ornament, down through axial bore 34 in the upper plug, and through the coil spring 30, where it engages an eyelet of the bolt 36, which passes through the bore 38 of the lower plug and engages nut 40. As the nut 40 is tightened, the coil spring 30 is compressed.

Mounted on each of the plugs 24 and 26 are contacts 42 and 44, respectively. Because the plugs are non-conductive, the contacts can be simply made of metal, such as stainless steel, with an attachment point for a wire, and two outwardly directed flanges 46 to increase the contact area and the reliability of the device. The flanges 46 are shown spaced apart a considerable distance for ease in visualizing the structure, but in practice, the nut 40 would be tightened onto the bolt 36 until the contacts were barely separated, perhaps by $\frac{1}{8}$ of an inch. Obviously, they must be separated enough to prevent them from arching or dissipating the battery charge across the gap in humid weather.

One of the contacts is connected to a battery directly, or on the "hot" side of a fuse, or any other power point in the vehicle which is not de-energized when the ignition is off. The other contact is wired directly to the horn. There may be other wiring arrangements which would accomplish the intended goal, such as wiring the device to a burglar alarm, etc. However, the above-described wiring scheme is quite simple and effective.

When so wired, it can be seen that when a thief attempts to remove the ornament, and in the process deflects it or pulls it upwardly, the contact flanges 46 are brought into contact with one another, completing the circuit between power and the horn (or, depending on the wiring system of the vehicle, between ground and horn), sounding the horn, hopefully startling the thief and drawing attention of passersby to the vehicle, scaring him into leaving the site.

The device is so simple and so foolproof and so easy to install, and so inexpensive to manufacture, that the inventor has had success in having them installed at the dealership on new vehicles as a matter of course. Conceivably, they could even be installed at the point of manufacture of the vehicle. In the latter case, the exact dimensions would be known and the alarm could be made smaller and with even cheaper materials, because the arrangement illustrated and claimed herein provides a fairly long range of adjustments of the nut 40 on the bolt to accommodate different relative positionings of the pin 20 at the hood ornament relative to the location of the lower plug 26 when the unit is installed. With this latitude built into the disclosed embodiment, all or virtually all available hood ornaments can be accommodated simply by adjusting the nut 40 until the contacts are spaced a sixteenth or an eighth inch apart.

We claim:

1. A hood ornament alarm actuator for a hood ornament attached to a hood with a resilient means extending through a hole in said hood to retain said ornament in place, said actuator comprising;
    (a) An upper plug having an axial bore therethrough;
    (b) A lower plug having an axial bore therethrough substantially aligned with the axial bore of said upper plug;
    (c) Spring means biasing said plugs apart;
    (d) Elongated retainer means for engaging said hood ornament and extending down through the hole in the hood, passing through the axial bores in each of said plugs and engaging said lower plug; and
    (e) A pair of electrical contacts mounted to said respective plugs and being adapted to connect to wires leading respectively to a vehicle power point (or ground) and a contact on the vehicle horn, such that an attempt to remove the hood ornament raises said retainer means, compressing said plugs towards one another against said spring means, and bringing said contacts into mutual contact to activate the vehicle horn.

2. A hood ornament alarm actuator according to claim 1 wherein said hood ornament has an attachment crossbar and said retainer means comprises a hook connected to said crossbar and a bolt extending down from the lower end of said hook and through said lower plug into a threaded retainer nut, such that variable settings of said retainer nut adapt said actuator to adjust the position of the hood ornament.

3. A hood ornament alarm actuator according to claim 2 wherein said spring means comprises a coil spring, and said plugs each define an annular seating which seats the ends of said coil spring.

4. A hood ornament alarm actuator according to claim 3 wherein said upper plug defines an upper boss which seats in the underside of the hole of said hood.

5. A hood ornament alarm actuator according to claim 1 wherein said plugs are defined of insulating material and said contacts are bare metal.

6. A hood ornament alarm actuator according to claim 5 wherein said contacts are stainless steel.

7. A hood ornament alarm actuator according to claim 5 wherein said contacts each have a laterally extended flange to multiply the possible contacting surface area for purposes of reliability in operation.

* * * * *